June 8, 1954  S. H. EDGE ET AL  2,680,654
CONTROL VALVE MECHANISM
Filed March 27, 1950  2 Sheets-Sheet 1

Inventor
Stanley Howard Edge
Harold Jeffery
By Morris & Bateman
Attorneys

Patented June 8, 1954

2,680,654

UNITED STATES PATENT OFFICE 2,680,654

CONTROL VALVE MECHANISM

Stanley Howard Edge and Harold Jeffery, Lincoln, England, assignors to Clayton Dewandre Company Limited, Lincoln, England, a British company Application March 27, 1950, Serial No. 152,152

Claims priority, application Great Britain March 28, 1949

7 Claims. (Cl. 303—54)

This invention relates to valve devices for use in controlling the braking of tractor and trailer vehicles and has for its object to provide an improved construction or arrangement designed to avoid the difficulty frequently experienced hitherto that were a common brake actuator is employed for compressed air brake application on coupled tractor and trailer vehicles, the tractor is liable to be braked first with the result of damage due to over-running by the trailer vehicle.

According to the present invention a control valve mechanism for use in a compressed air braking system applicable to tractor and trailer vehicles is characterised by two separate and similar valve devices for permitting or preventing the flow of compressed air to the tractor and trailer brake cylinders respectively and a common actuating member arranged during its operative movement to operate first the trailer brake control valve to apply the trailer brakes and thereafter the tractor brake control valve to apply the tractor brakes.

Reference will now be made to the accompanying drawings which show a control valve mechanism constructed according to the invention and in which.

Figure 1:
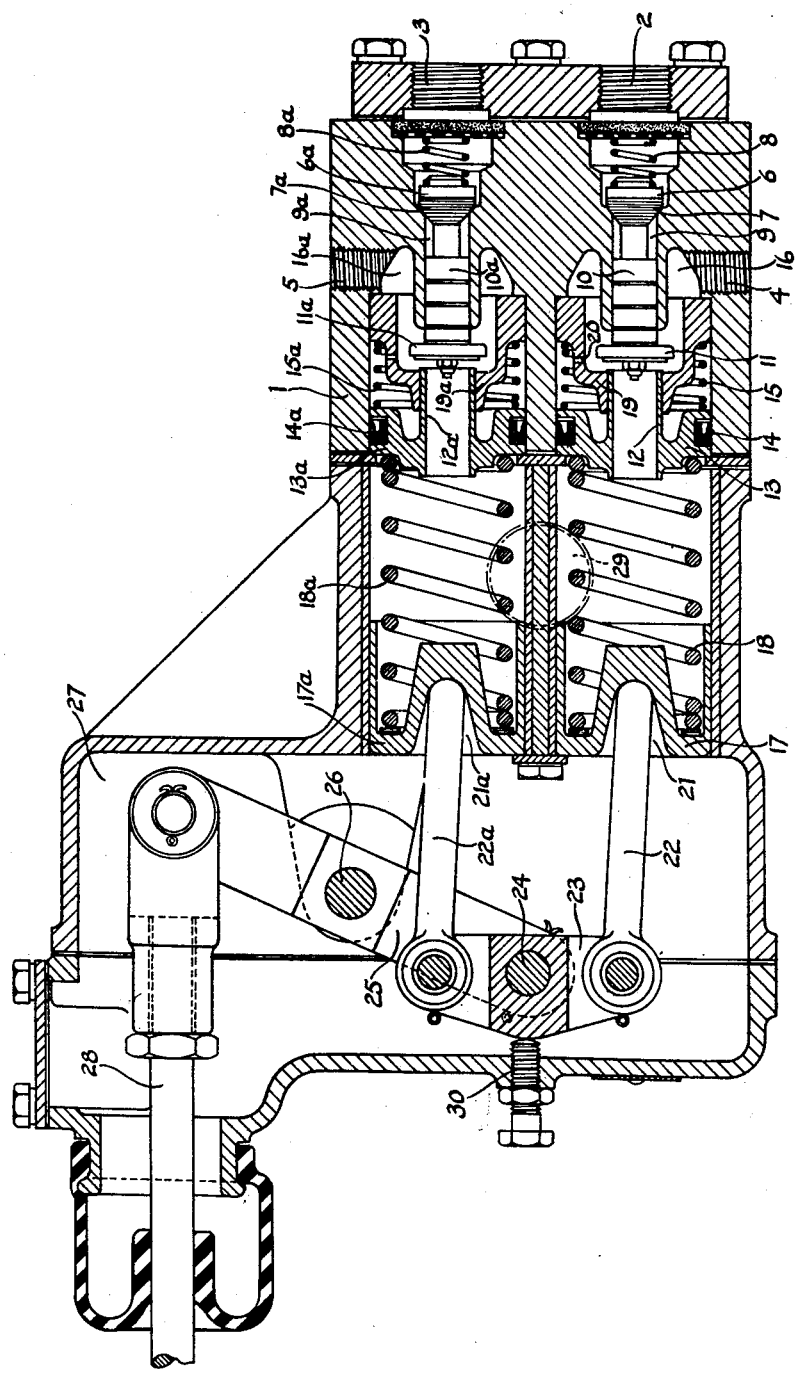
Fig. 1 is a longitudinal sectional view.
Figure 2:
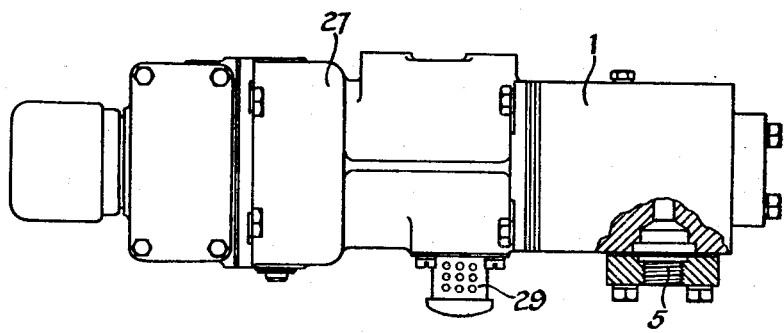
Fig. 2 is a plan of Fig. 1, partly in section and on a reduced scale.
Figure 3:
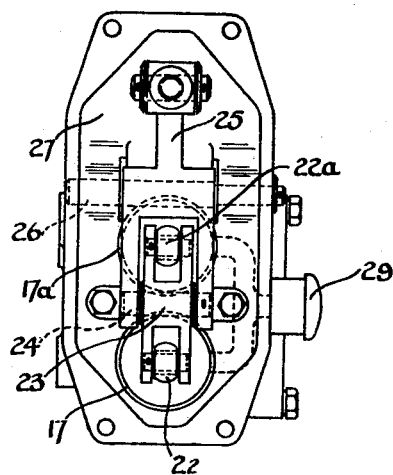
Fig. 3 is an end elevation, also on a reduced scale, and with the end cover removed.

In the construction illustrated and referring first to Fig. 1, a control valve mechanism for application to a compressed air braking system for a tractor and a trailer vehicle includes a casing 1 having connections at 2 and 3 communicating respectively with tractor and trailer compressed air reservoirs; and connections 4 and 5 communicating respectively with tractor and trailer brake cylinders. Within the casing 1 are arranged two generally similar valve mechanisms each being constructed as follows:

The connection 2 to the tractor reservoir is controlled by a coned valve member 6 co-operating with a seating 7 and normally held thereon by a spring 8 and by the air pressure from the reservoir. The seating 7 surrounds the end of a passage 9 wherein the valve stem 10 is slidable, the said valve stem carrying, at its end remote from the valve member 6, a disc valve member 11 adapted to co-operate with a hollow cylindrical valve member 12 forming part of a piston 13 movable in a cylinder 14, forming part of the casing 1, against the action of a spring 15. One end of the cylinder 14 is in free communication with an annular space 16 which in turn communicates with the outlet 4 to the tractor brake cylinders. The cylinder 14 also contains a second piston 17 separated from the piston 13 by a spring 18. Between the two pistons is a breather device 29 which affords a communication to atmosphere for both sets of brake cylinders when the parts are in the inoperative positions shown. The cylindrical valve member 12 moves in a fixed guide member 19 which also serves to prevent the sudden inrush of compressed air from pressing the piston 13 backwards. A small aperture 20 in the member 19 throttles the rush of air to the piston while ensuring its correct operation and preventing reciprocatory chattering movements.

The outer end of the piston 17 is formed with a socket 21 in which engages the end of a rod 22 pivotally connected to one end of a beam 23 movable about a pivot 24 at one end of a rocking arm 25 movable about a fixed pivot 26 disposed in an enlarged portion 27 of the casing 1. The end of the arm 25 remote from the pivot 24 is pivotally connected to a pull rod 28 which forms the connection between the pedal or other brake actuator and the rocking arm 25.

The valve mechanism controlling communication between the compressed air inlet 3 and the outlet 5 to the trailer brake cylinders is similar to the mechanism already described and its component parts are indicated by the same reference numerals with the addition of the letter a. The piston 17a has a socket 21a in which engages a rod 22a connected to the end of the beam 23 remote from the connection of the rod 22. The difference between the two arrangements is that the spring 15a of the trailer brake mechanism is a lighter spring than the spring 15.

Movement of the beam 23 to its inoperative position is limited by its engagement with a stop 30 adjustably mounted in the outer wall of the casing portion 27.

The operation of the arrangements above described is as follows:

Operation of the brake actuator causes the pull rod 28 to be moved towards the left (Fig. 1) and to rock the arm 25 in an anti-clockwise direction around its pivot 26 and carry the beam 23 and the rods 22 and 22a towards the valve cylinders 14 and 14a. This movement is communicated through pistons 17, 17a, 13, 13a to the hollow valve members 12 and 12a which are thereby seated on their respective disc valve members 11 and 11a. Owing to the difference in strengths of the springs 15 and 15a, however, the transmission to the trailer brake control valve member 6a takes place before the tractor brake control valve member 6 is operated. The effect of these operations is to seal off the outlet 5 from atmosphere and to put it in communication with the inlet 3 whereby compressed air flows through the outlet 5 to the trailer brake cylinders to cause application of the brakes on the trailer vehicle. This operation is followed by a similar series of operations whereby the hollow valve member 12 is seated on the disc valve member 11 and the cone valve member 6 lifted from its seating. These operations cause the tractor cylinders to be shut off from atmosphere and to be placed in communication with the compressed air inlet at 2 to apply the tractor brakes after the brakes have been applied on the trailer vehicle. When pressure on the actuator is relaxed, the springs 8, 8a, 15, 15a, 18 and 18a restore all the parts of the mechanism to the inoperative positions shown in Fig. 1 and the respective brake cylinders are opened to atmosphere through the annular spaces 16 and 16a, the hollow valve members 12 and 12a and the breather device 29.

What we claim is:

1. A control valve mechanism for supplying pressure fluid in succession to a pair of fluid pressure operated devices, comprising a casing having therein a pair of cylinders and a pair of valve chambers, and having an exhaust port, and ports for supplying pressure fluid to the respective valve chambers and ports for connecting the valve chambers respectively to said devices, a pair of pistons operative in each cylinder, an actuating lever, an equalizing lever pivoted on said actuating lever, means connecting the equalizing lever at opposite sides of its pivot to one piston of each pair for applying equal actuating forces thereto, a double acting valve operative by the other piston of each pair, each valve having a valve component which is operated to open the pressure fluid supply port to the respective valve chamber and having another valve component operated to close the respective valve chamber to the exhaust port by operation of said other piston, means for transmitting said actuating forces from one piston to the other piston of each pair, and a spring opposing movement of a piston of each pair, one of said springs being stronger than the other spring and acting in response to the application of said equal actuating forces to delay operation of the respective valve relatively to the operation of the other valve.

2. A control valve mechanism as defined in claim 1, including springs separating the pistons of each pair for transmitting said actuating forces from one piston to the other piston of each pair.

3. A control valve mechanism as defined in claim 1, wherein said exhaust port is between the pistons of each pair, and one of the pistons of each pair is provided with a hollow cylindrical valve member for communication between the respective valve chamber and the exhaust port and is controlled by the respective valve component.

4. A control valve mechanism for supplying pressure fluid in succession to a pair of fluid pressure operated devices, comprising a casing having therein a pair of cylinders and a pair of valve chambers, and having an exhaust port, and ports for supplying pressure fluid to the respective valve chambers and ports for connecting the valve chambers respectively to said devices, an actuating piston and a valve controlling piston operable in each cylinder, the valve controlling piston of each pair having a port therein to provide communication between the respective valve chamber and the exhaust port, a valve member for each pair of pistons having a valve component cooperative with the respective pressure fluid supply port for controlling admission of pressure fluid to the respective valve chamber and having another valve component cooperative with the port in the respective valve controlling piston for controlling communication between the respective valve chamber and the exhaust port, an actuating lever, an equalizing lever pivoted on said actuating lever, means connecting the equalizing lever at opposite sides of its pivot to the actuating piston of each pair for applying equal actuating forces thereto, a spring opposing movement of the valve controlling piston of each pair, and yieldable means between the actuating piston and the valve controlling piston of each pair for actuating the respective valve controlling piston and valve member to close the respective valve chamber to the exhaust port and to open the respective port for supplying pressure fluid to the respective valve chamber, one of said springs being stronger than the other spring, and said springs acting in response to the application of said equal actuating forces to the actuating pistons to cause successive actuations of the respective valve members.

5. A control valve mechanism for supplying pressure fluid in succession to a pair of fluid pressure operated devices, comprising a casing having a pair of valve chambers and a pair of cylinders therein, and having an exhaust port and ports for supplying pressure fluid to the respective chambers and ports for connection respectively to the fluid pressure operated devices, a pair of pistons operable in each cylinder, one piston of each pair having a port therein for providing communication between the respective valve chamber and the exhaust port, an actuating lever, an equalizing lever pivoted on said actuating lever, means connecting the equalizing lever at opposite sides of its pivot to the other pistons of said pairs for applying equal actuating forces thereto, yieldable motion transmitting means interposed between the pistons of each pair, a valve member for each pair of pistons having a valve component thereon engageable by the piston having the port therein for closing said port and having another valve component operable to open the respective port to admit pressure fluid to the respective valve chamber, and a spring opposing movement of each of the pistons having the port therein, one of said springs being stronger than the other spring, and said springs acting in response to application of said equal actuating forces to cause the piston opposed by the weaker spring to actuate the respective valve member in advance of actuation of the valve member controlled by the other pair of pistons.

6. A control valve mechanism for supplying pressure fluid in succession to a pair of fluid pressure operated devices, comprising a casing having a pair of valve chambers and a pair of cylinders therein, and having an exhaust port and ports for supplying pressure fluid to the respective valve chambers and ports for connection respectively to the fluid pressure operated devices, a pair of pistons operable in each cylinder, one piston of each pair having a port therein for providing communication between the respective valve chamber and the exhaust port, an actuating lever, an equalizing lever pivoted on said actuating lever, means connecting the equalizing lever at opposite sides of its pivot to the other pistons of said pairs for applying equal actuating forces thereto, yieldable means for transmitting said actuating forces from one piston to the other piston of each pair, a valve member for each pair of pistons having a valve component thereon engageable by the piston having the port therein for closing said port and having another valve component operable to open the respective port to admit pressure fluid to the respective valve chamber, and a spring opposing movement of each of the pistons having a port therein, one of said springs being stronger than the other spring, said springs acting in response to the application of said equal actuating forces to cause the piston opposed by the weaker spring to actuate the respective valve member in advance of actuation of the valve member controlled by the other pair of pistons.

7. A control valve mechanism for supplying pressure fluid in succession to a pair of fluid pressure operated devices, comprising a casing having therein a pair of cylinders and a pair of valve chambers, and having an exhaust port opening into said cylinders, and ports for supplying pressure fluid to the respective valve chambers and ports for connecting the valve chambers respectively to said devices, an actuating piston and a valve controlling piston operable in each cylinder, the valve controlling piston of each pair having a port therein and a tubular extension through which communication is provided between the respective valve chamber and the exhaust port, an axially movable valve member for each pair of pistons having a valve component at one end cooperative with the respective pressure fluid supply port for controlling admission of pressure fluid to the respective valve chamber and having a disc valve component at the other end cooperative with the tubular extension of the respective valve controlling piston for controlling communication between the respective valve chamber and the exhaust port, a spring opposing movement of the valve controlling piston of each pair, an actuating lever, an equalizing lever pivoted on said actuating lever, means connecting the equalizing lever at opposite sides of its pivot to the actuating piston of each pair for applying equal actuating forces thereto, and yieldable means between the actuating piston and the valve controlling piston of each pair for actuating the respective valve controlling piston and valve member to close the respective valve chamber to the exhaust port and to open the respective port for supplying pressure fluid to the respective valve chamber, one of said springs being stronger than the other spring, and said springs acting in response to the application of said equal actuating forces to cause successive actuations of the respective valve members.

References Cited in the file of this patent

UNITED STATES PATENTS

| Number | Name | Date |
|---|---|---|
| 1,872,397 | Bragg et al. | Aug. 16, 1932 |
| 2,329,742 | Bush et al. | Sept. 21, 1943 |
| 2,442,020 | Rodway | May 25, 1948 |